(No Model.)
H. BROOKE.
MOLDING SCREW FORMS IN PLASTIC MATERIAL.
No. 283,321. Patented Aug. 14, 1883.
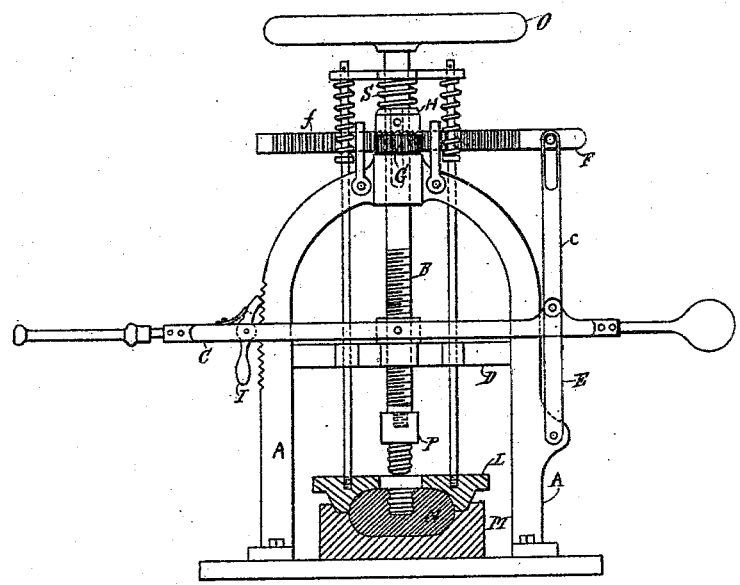
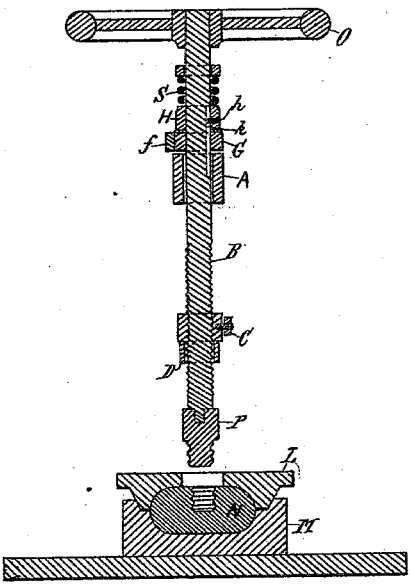
Witnesses:
Inventor
Homer Brooke
Per Frost & Coe
Attys.

UNITED STATES PATENT OFFICE.

HOMER BROOKE, OF JERSEY CITY, NEW JERSEY.

MOLDING SCREW FORMS IN PLASTIC MATERIAL.

SPECIFICATION forming part of Letters Patent No. 283,321, dated August 14, 1883.

Application filed April 27, 1883. (No model.)

*To all whom it may concern:*

Be it known that I, HOMER BROOKE, a citizen of the United States, residing at Jersey City, in the State of New Jersey, have invented a new and useful Improvement in Molding Screw Forms in Plastic Material, of which the following, taken in connection with the accompanying drawings, is a full, clear, and accurate description.
The difficulty heretofore experienced in molding screw-threads in plastic material has been that when the die was pressed into the material when in a plastic state said material has a tendency to set and become fast in the screw-threads, or in any inequalities in the die, before the die can be removed.

The object of my invention is to remove this difficulty by giving the die a backward or withdrawing motion simultaneously with its forward or entering motion into the plastic material, thus removing all danger of breaking, dragging, or disturbing the screw. This is accomplished by providing means in the frame holding the die whereby the act of pressing the die into the material actuates mechanism which gives the spindle carrying the die an upward or reverse motion.

The drawings represent my mechanism in Figure 1, Fig. 2 showing a section thereof.
In the drawings, A represents the frame of the machine, in which moves the cross head or bar D. Through the bar D passes the spindle B, having cut thereon a screw-thread, b, working into a corresponding screw-thread on said bar. The spindle B also passes through a sleeve or enlargement at the top of the frame A.

C is an L-shaped lever attached to the outside of the middle of the cross-head D, and having its fulcrum at one side of the frame A, in the center of a toggle-joint formed by the bar E and the short arm $c$ of the lever C, one end of the bar E being pivoted to the frame A. The lever C is provided at the other side of the frame with a pawl, I, engaging with ratchet-teeth formed on the side of said frame, and may be provided with a spring or other suitable means for holding said pawl against said ratchet-teeth. The upper arm, $c$, of the lever C is provided with a slot fitting onto a pin in bar F. This bar F is suitably supported above the frame A in front of the spindle B, and is provided on its inner surface with a rack or ratchet-teeth, $f$, meshing into a pinion, G, which fits loosely on the spindle B. On the upper surface of said pinion G are cut ratchet-teeth, meshing into and engaging with corresponding teeth cut into the lower surface of the collar or clutch H. This clutch H is so arranged that the spindle B is free to move longitudinally through it; but by means of a key, $h$, fitting into a proper groove, K, in the spindle B, said clutch is carried around with the revolutions of said spindle.

S is a spring holding said clutch in contact with the pinion G.

M is the lower part of the mold, holding the plastic material, and L L are the upper parts of said mold, held in position by any suitable means.

N is the material in which the screw is to be formed, and P the plunger or former on the lower end of the spindle B, which forms the screw-thread in the material.

O is a balance or hand wheel placed on the upper end of the spindle B.

The mode of operation of my improvement is as follows: The material in which the screw-thread is to be formed being placed in the mold, the lever C is pressed downward, carrying with it the cross-head D, with its engaged spindle B, and the plunger P, pressing the latter into the material, the toggle-joint formed by the shorter arm, $c$, of lever C and the bar E permitting a perpendicular movement of the spindle B by means of the attachment of the lever C to the cross-head D. At the same time the downward movement of the short arm $c$ of the lever C sets in operation the rack $f$ on the bar F, which, engaging with the pinion G, communicating motion to the collar H, causes the spindle B to revolve in an upward direction, these two simultaneous motions giving the plunger or former P a pressing motion into the material, and at the same time a backward outward motion. When the former or plunger P has penetrated sufficiently into the material to make the proper form therein, the pressure on the lever C is stopped, and the pawl I, engaging with the ratchet-teeth on frame A, holds the lever in position. At the same time the upward backward motion of the spindle B is continued by the continued revolution of the balance or hand wheel O, and this being further increased by the hand of the operator, the former P is backed entirely out of the material.

Having thus described my invention, what I claim, and desire to secure by Letters Patent, is—

1. A machine for forming screw-threads in plastic material, consisting of an upright frame having a weighted cross-lever pivoted at one side of said frame and held in place by pawl and ratchet at the opposite side, a screw-threaded spindle vertically journaled through the top of said frame, and having a hand-wheel on its outer end, coiled springs, guide-rods, cross-bar, and pinion, with suitable clutches, a cross-head below the lever, through which the rods and spindle pass, and a mold secured below said spindle for holding plastic material, said mechanism adapted to give a simultaneous vertical, rotary, and reverse movement, as shown and specified.

2. The combination of the frame A, the lever C, cross-head D, vertical spindle B, hand-wheel O, cross-arm F, collar-clutch H, rods *f*, spring S, connections *c*, pinion G, key *h*, and plunger P, with the plastic material N, lower mold part, M, and the upper mold part, L, all arranged and operated substantially as shown and specified.

HOMER BROOKE.

In presence of—
R. T. VAN BOSKERCK,
CHARLES G. COE.